US010854021B2

(12) United States Patent
Weber et al.

(10) Patent No.: US 10,854,021 B2
(45) Date of Patent: Dec. 1, 2020

(54) ENERGY MANAGEMENT SYSTEM AND METHOD

(71) Applicants: CUMMINS INC., Columbus, IN (US); AGILITY FUEL SYSTEMS, INC., Santa Ana, CA (US)

(72) Inventors: Gregory A. Weber, Greensburg, IN (US); Eric Coupal-Sikes, Santa Monica, CA (US); Todd F. Sloan, Kelowa (CA); Morgan M. Andreae, Columbus, IN (US); Jean-Patrick V. Rich, Nashville, IN (US)

(73) Assignee: Cummins Inc., Columbus, IN (US)

( * ) Notice: Subject to any disclaimer, the term of this patent is extended or adjusted under 35 U.S.C. 154(b) by 120 days.

(21) Appl. No.: 15/966,645

(22) Filed: Apr. 30, 2018

(65) Prior Publication Data

US 2018/0315256 A1    Nov. 1, 2018

Related U.S. Application Data

(60) Provisional application No. 62/492,275, filed on Apr. 30, 2017.

(51) Int. Cl.

| | |
|---|---|
| *G07C 5/00* | (2006.01) |
| *G05B 19/048* | (2006.01) |
| *G01C 21/34* | (2006.01) |
| *G01C 21/36* | (2006.01) |
| *B60Q 9/00* | (2006.01) |

(Continued)

(52) U.S. Cl.
CPC .............. *G07C 5/004* (2013.01); *B60K 35/00* (2013.01); *B60Q 9/00* (2013.01); *G01C 21/3469* (2013.01); *G01C 21/362* (2013.01); *G01C 21/3679* (2013.01); *G01C 21/3697* (2013.01); *G05B 19/042* (2013.01); *G05B 19/048* (2013.01);

(Continued)

(58) Field of Classification Search
CPC .......... G07C 5/004; B60K 35/00; B60Q 9/00; G01C 21/3469; G01C 21/362; G01C 21/3679; G01C 21/3697; G05B 19/042; G05B 19/048

See application file for complete search history.

(56) References Cited

U.S. PATENT DOCUMENTS

| | | | |
|---|---|---|---|
| 8,880,270 B1 * | 11/2014 | Ferguson .............. | B60W 30/00 701/23 |
| 10,049,505 B1 * | 8/2018 | Harvey .................. | G07C 5/008 |

(Continued)

*Primary Examiner* — Hussein Elchanti

(74) *Attorney, Agent, or Firm* — Faegre Drinker Biddle & Reath LLP

(57) ABSTRACT

A fuel system controller obtains fuel burn data from an engine control module (ECM). The fuel system controller also obtains location data from a telematics control module, such as GPS location data identifying the location of a vehicle. The fuel system controller determines the vehicle's base location based on the location data, and determines how far the vehicle can travel based on the fuel burn data. The fuel system controller determines how many fueling stations are with a threshold distance of the determined distance to empty. The fuel system controller can use that data to identify which, and how many, fueling stations are within a threshold distance of the determined distance to empty. The fuel system controller can provide a fueling warning indication based on the number of fueling stations that are within the determined distance to empty.

18 Claims, 5 Drawing Sheets

(51) Int. Cl.
    *B60K 35/00*       (2006.01)
    *G05B 19/042*    (2006.01)

(52) U.S. Cl.
    CPC .............. *G05B 2219/45018* (2013.01); *G05B 2219/45076* (2013.01)

(56) References Cited

U.S. PATENT DOCUMENTS

| | | | |
|---|---|---|---|
| 10,263,862 B1 * | 4/2019 | Benkreira | H04L 51/02 |
| 10,477,025 B1 * | 11/2019 | Edwards | H04M 3/5232 |
| 2008/0284678 A1 * | 11/2008 | Randel | B60K 35/00 |
| | | | 345/55 |
| 2009/0265099 A1 * | 10/2009 | Gottlieb | G01C 21/3697 |
| | | | 701/532 |
| 2011/0196600 A1 * | 8/2011 | Henderson | G01C 21/3697 |
| | | | 701/123 |
| 2012/0083959 A1 * | 4/2012 | Dolgov | G05D 1/0214 |
| | | | 701/23 |
| 2012/0116670 A1 * | 5/2012 | Rosekrans | G01C 21/3469 |
| | | | 701/426 |
| 2012/0221234 A1 * | 8/2012 | Sujan | G06Q 10/04 |
| | | | 701/123 |
| 2013/0173106 A1 * | 7/2013 | Konishi | B60K 6/46 |
| | | | 701/22 |
| 2018/0164105 A1 * | 6/2018 | Park | G08G 1/09685 |
| 2019/0061779 A1 * | 2/2019 | Mohan | B60Q 11/00 |

* cited by examiner

ENERGY MANAGEMENT SYSTEM AND METHOD

RELATED APPLICATIONS

The present disclosure is related to and claims priority to U.S. Provisional Application No. 62/492,275, entitled "DON'T PASS THE STATION CONTROLS ALGORITHM METHOD AND APPARATUS," filed on Apr. 30, 2017, the entire disclosure of which is hereby expressly incorporated herein by reference.

FIELD OF THE DISCLOSURE

The present disclosure relates generally to engines and, more particularly, to engine energy management control systems.

BACKGROUND

Engines, such as combustion engines, commonly include engine energy management control systems to control the use of energy consumed by the engine. For example, natural gas or diesel engines typically include fuel systems that manage the fuel supplied to pistons for combustion. Likewise, alternative fueled engines, such as electric engines, include systems that manage the use of the alternative fuel, such as energy supplied by a battery. These engine energy management control systems typically include indications or warnings to the driver of a vehicle (e.g., truck, car, boat, etc.) when the energy supply (e.g., fuel supply), is running low.

Despite these features, operators of vehicles often worry that they will run out of their energy supply (e.g., fuel, battery) before reaching a refueling station, such as a gas station or a charging station in the case of electric vehicles. For example, because the infrastructure for alternative fuel stations is sparse, operators of alternative fueled vehicles often experience anxiety caused by worrying that they will run out of fuel or energy and will require a tow truck or a refueling truck to provide more fuel or energy. Those of ordinary skill in the art would recognize additional problems as well. As such, there are opportunities to provide improved engine energy management control systems to address these and other issues.

SUMMARY

In one example, a fuel system controller obtains fuel burn data from an engine control module (ECM). The fuel burn data can be, for example, a current fuel burn rate of the engine. The fuel system controller also obtains location data from a telematics control module, such as GPS location data identifying the location of the vehicle. The fuel system controller then determines the vehicle's base location based on the location data, and determines how far the vehicle can travel (i.e., distance to empty) based on the fuel burn data. For example, the fuel system controller determines the current fuel supply and, by assuming the vehicle will keep the current fuel burn rate, determine how far the vehicle can travel before it exhausts the fuel supply. In some examples, live traffic and road condition information can be used in determining the distance to empty. For example, the fuel system controller may decrease the determined distance to empty if there is traffic or bad road conditions (e.g., rain, detours, etc.). In one example, the determined distance to empty is based on a distance before the vehicle is derated (e.g., the power of the engine is reduced). For example, if the vehicle is derated if the fuel supply reaches a certain level (e.g., a low level), the determined distance to empty is based on the amount of fuel before that level is reached.

The fuel system controller then determines how many fueling stations are with a threshold distance of the determined distance to empty. For example, the fuel system controller may access fueling station map data which identifies the locations of fueling stations. The fueling station map data may identify all fueling stations, or only preferred fueling stations. The fuel system controller can instruct a display device to display at least one indication on the display device based on a user preference. For example, the preferred fueling station can be a specific brand name of gas station and a list of the gas stations can be prepared for display. The list can include either the specific brand names of gas stations only or can include even the ones that are not preferred. In another embodiment, the fuel system controller filters out the non-preferred fueling stations or highlight only the preferred fueling stations in the list. Thus, it is advantageous that an identification of the preferred fueling stations is readily achieved for the operator.

The fuel system controller can then use that data to identify which, and how many, fueling stations are within some threshold (e.g., percentage, set distance, etc.) of the determined distance to empty. The fuel system controller may only identify, for example, those fueling stations that are within a radial distance of the current location of the vehicle as identified by the GPS data mentioned above. In one example, the fuel system controller identifies only those stations that are within a distance along a planned route. For example, fueling stations along a planned or known route may be prioritized to minimize travel to each of the fueling stations. In another example, the fuel system controller identifies only those fueling stations that are within a distance along the direction of travel (e.g., not identify any stations that the vehicle has already passed).

The fuel system controller can then provide a fueling warning indication based on the number of fueling stations that are within the determined distance to empty. For example, the fuel system controller may cause the dashboard display to flash a red light if there are a minimal (e.g. 1, 0) fueling stations determined to be within the determined distance to empty.

In one example, a fuel system controller determines a distance to empty based on fuel burn data. The fuel system controller then receives fueling station map data that identifies the locations of fueling stations, and determines how many of the fueling stations are within a threshold distance of the determined distance to empty. The fuel system controller then cause a fueling warning indication to display based on the number of fueling stations that are within the threshold distance of the determined distance to empty.

Although the above examples are explained in relation to fuel systems, electric systems, and systems that operate on other energy sources, are also contemplated. For example, rather than gas fueling stations, the identification of recharging stations for electric vehicles are based on a distance to empty is also contemplated.

In one embodiment of the present disclosure, a fuel system controller is provided. Included in the fuel system controller are an engine control module (ECM) interface operable to obtain fuel burn data from an ECM, a telematics data interface operable to obtain location data from a telematics control module, and fuel stop determination logic operably coupled to the ECM interface and the telematics data interface. The fuel stop determination logic is configured to determine a base location based on the location data, determine a distance to empty based on the fuel burn data, determine based on fueling station map data whether each of a distance from the base location to one or more fueling stations is within a threshold distance of the determined distance to empty, and provide a fueling warning indication based on a number of fueling stations that are within the threshold distance of the determined distance to empty.

In one example, the fuel stop determination logic is operable to provide the fueling warning indication by comparing the number of fueling stations that are within the threshold distance of the determined distance to empty to at least one of: a high threshold and a low threshold. In another example, the fuel stop determination logic is operable to display at least one indication on a display device based on the number of fueling stations. In a variation, when the number of fueling stations is at or above the high threshold, the fuel stop determination logic generates a first indication. In another variation, when the number of fueling stations is between the high threshold and the low threshold, the fuel stop determination logic generates a second indication. In yet another variation, when the number of fueling stations is at or below the low threshold, the fuel stop determination logic generates a third indication.

In yet another example, the location data comprises global positioning system (GPS) data. In a variation, the fuel stop determination logic is operable to determine the base location based on the GPS data.

In still another example, the base location includes a current location. In yet still another example, the fuel burn data includes a current fuel burn rate of an engine.

In another embodiment of the present disclosure, a method by a fuel system controller is disclosed. The method includes obtaining fuel burn data from an ECM, obtaining location data from a telematics control module, determining a base location based on the location data, determining a distance to empty based on the fuel burn data, determining based on fueling station map data a number of fueling stations that are within a threshold distance of the determined distance to empty, and providing a fueling warning indication based on a number of fueling stations that are within the threshold distance of the determined distance to empty.

In one example, the method further includes providing the fueling warning indication by comparing the number of fueling stations that are within the threshold distance of the determined distance to empty to at least one of: a high threshold and a low threshold. In another example, the method further includes displaying at least one indication on a display device based on the number of fueling stations. In a variation, the method further includes generating a first indication when the number of fueling stations is at or above the high threshold. In another variation, the method further includes generating a second indication when the number of fueling stations is between the high threshold and the low threshold. In yet another variation, the method further includes generating a third indication when the number of fueling stations is at or below the low threshold.

In yet another example, the method further includes including global positioning system (GPS) data in the location data. In a variation, the method further includes determining the base location based on the GPS data. In another variation, the method further includes including a current location in the base location. In yet another variation, the method further includes including a current fuel burn rate of an engine in the fuel burn data.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF EMBODIMENTS

Figure 1:
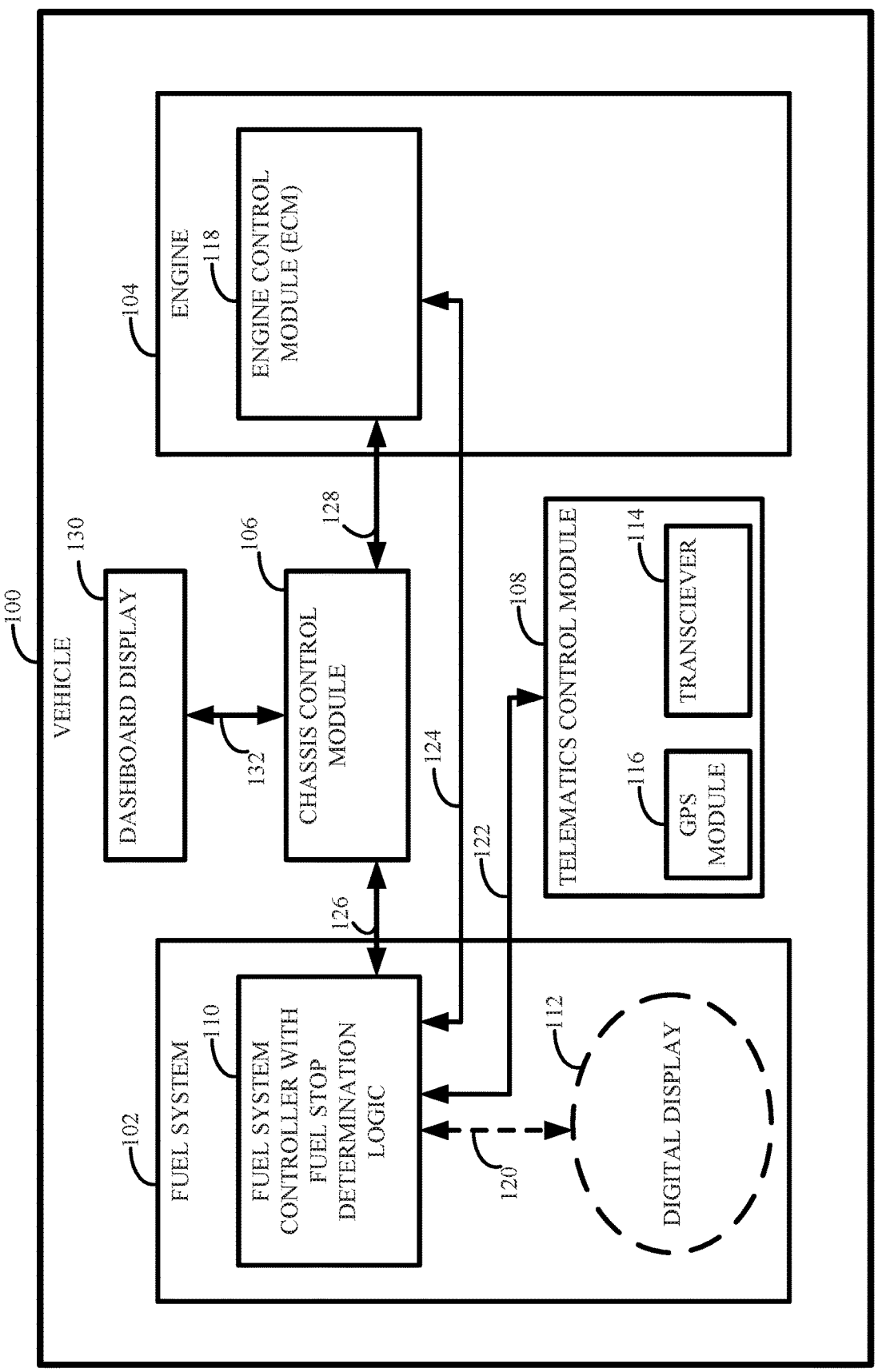
FIG. 1 is block diagram of a vehicle with a fuel system that includes a fuel system controller with fuel stop determination logic a in accordance with one example as set forth in this disclosure.

While the present disclosure is amenable to various modifications and alternative forms, specific embodiments have been shown by way of example in the drawings and are described in detail below. The present disclosure, however, is not to limit the particular embodiments described. On the contrary, the present disclosure is intended to cover all modifications, equivalents, and alternatives falling within the scope of the appended claims.

Referring to FIG. 1, a vehicle 100 includes a fuel system 102 that provides fuel to engine 104. Engine 104 includes an engine control module (ECM) 118 (e.g., an engine control unit (ECU)), which can optimize engine performance by reading sensors located throughout the engine, interpreting the data, and providing signaling to, for example, control the engine's air-fuel mixture and ignition timing, among other functionality as is recognized in the art. In one example, the ECM 118 provides fuel burn rate data, which indicates a rate at which fuel is being consumed by vehicle 100. The fuel burn rate data can include, for example, a current fuel burn rate, or an average burn fuel rate for a period of time (e.g., over the last day, hour, 5 minutes, 30 seconds, etc.).

Vehicle 100 also includes a chassis control module 106 which, among other things, can control dashboard display 130 over communication link 132. For example, chassis control module 106 can control the display of indications on dashboard display 130. Vehicle 100 further includes telematics control module 108 (e.g., a telematics control unit (TCU)), which as known in the art controls tracking of a vehicle. In this example, telematics control module 108 includes global positioning system (GPS) module 116 to receive GPS location data information, as well as transceiver 114 to allow connection to a network, such as a wireless network. In one example, telematics control module 108 can connect, via transceiver 114, to a network that provides access to the Internet, such as a cellular network, WiFi network, or any other such network. Communication link 132, and any other communication link described below, can be any suitable communication link that allows for communications between connected entities. For example, the communication links can be hard wired links, wireless links, or any other suitable links.

Fuel system 102 includes fuel system controller with fuel stop determination logic 110, which is operably coupled to ECM 118 over communication link 124. In one example, fuel system controller with fuel stop determination logic 110 receives fuel burn data from ECM 118 over communication link 124. Fuel system controller with fuel stop determination logic 110 is also operably coupled to telematics control module 108 over communication link 122. Fuel system controller with fuel stop determination logic 110 can receive, over communication link 122, location data, such as GPS location data information, from telematics control module 108. Fuel system controller with fuel stop determination logic 110 can also access a network, such as a wireless network providing access to the Internet, via telematics control module 108 over communication link 122.

Fuel system 102 optionally includes a digital display 112, which can be in communication with fuel system controller with fuel stop determination logic 110 over communication link 120. Digital display 112 can be, for example, a smart display that can be controlled directly by fuel system controller with fuel stop determination logic 110. For example, fuel system controller with fuel stop determination logic 110 can be operable to control digital display 112 to display various indications, such as fuel warning indications. In one example, fuel system controller with fuel stop determination logic 110 controls digital display 112 to provide one of three different display warning types of the fuel warning indications while the ECM 118 is in an operating state. When vehicle 100 is in an operating state, the ECM 118 is also in the operating state. In one embodiment, a first display warning type can be a "no need to stop at next fueling station" indication (e.g., green light indication), a second display warning type can be a "should stop at an upcoming fueling station" indication (e.g., yellow light indication), and a third display warning type can be a "must stop at next fueling station" indication (e.g., red light indication). For example, the green light indication refers to a safe warning type, the yellow light indication refers to a caution warning type, and the red light indication refers to an imminent threat warning type.

Fuel system controller with fuel stop determination logic 110 is operably to communicate with chassis control module 106 over communication link 126. As such, fuel system controller with fuel stop determination logic 110 can control the display of indications on dashboard display 130 via chassis control module 106. For example, fuel system controller with fuel stop determination logic 110 can control dashboard display 130, via chassis control module 106, to display one or more of the fuel warning indications described above.

In some embodiments, some or all of the functions of fuel system 102 may be implemented in circuitry such as one or more of analog logic, digital logic, state machines, processors (e.g., central processing unit (CPU), general processing unit (GPU), microprocessor), field programmable arrays (FPGAs), application-specific integrated circuits (ASICs), or any other suitable circuitry. In some examples, some or all of the functions of fuel system 102 may be performed by any suitable processor or processors that may, for example, execute a software driver, firmware, or any other suitable executable code stored in memory. For example, some or all of the functions of fuel stop determination logic 110 may be performed by any suitable processing core. In some embodiments, fuel stop determination logic 110 may be a general processing unit (GPU), an accelerated processing unit (APU), a central processing unit (CPU), a field programmable gate array (FPGA), an application-specific integrated circuit (ASIC), or any other suitable instruction processing device, or any other device that accesses virtual memory.

Figure 2:
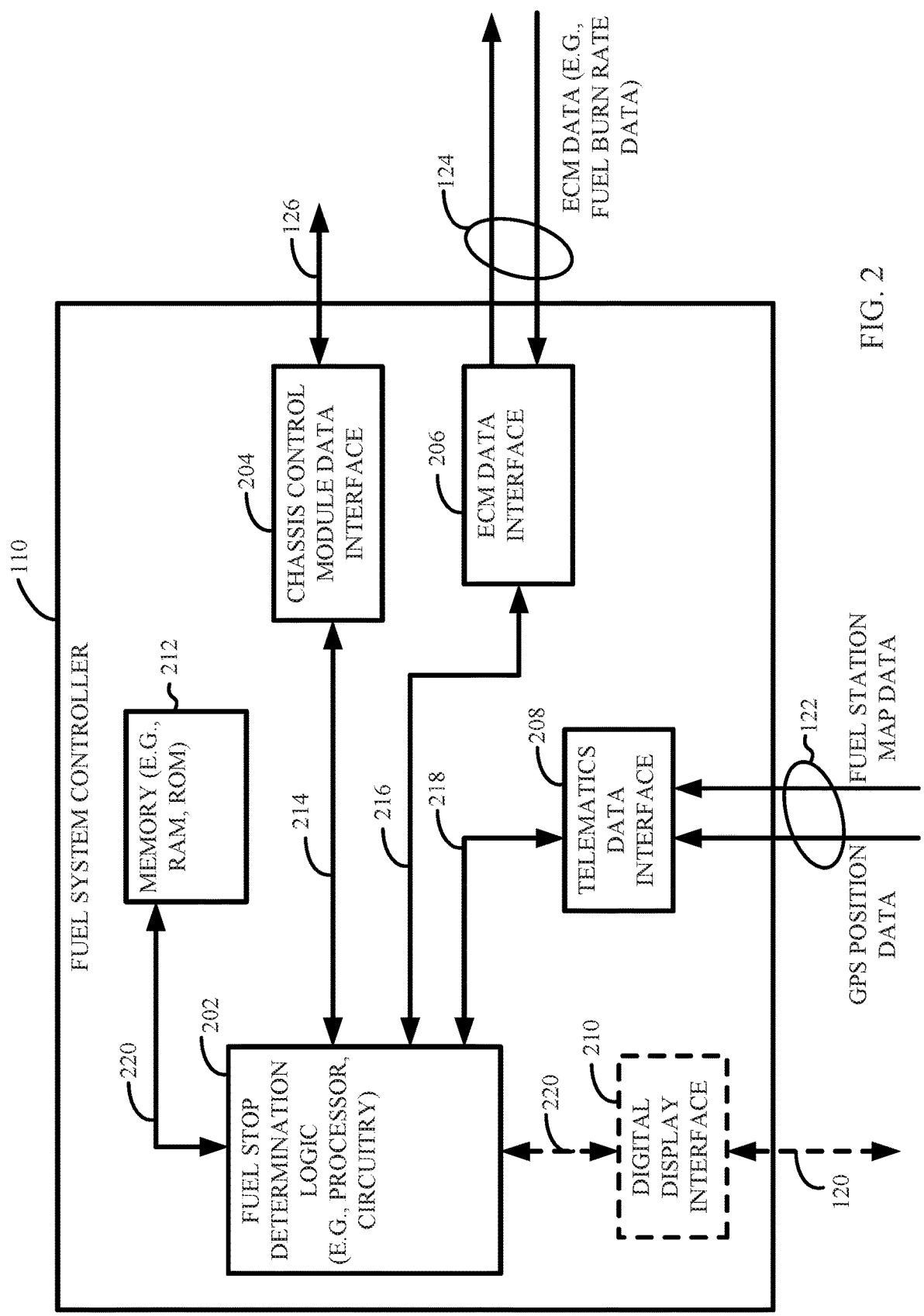
FIG. 2 is a block diagram of a more detailed view of the fuel system controller with fuel stop determination logic of FIG. 1 in accordance with one example as set forth in this disclosure.

FIG. 2 illustrates a more detailed block diagram of the fuel system controller with fuel stop determination logic 110 of FIG. 1. As indicated in FIG. 2, fuel system controller with fuel stop determination logic 110 includes chassis control module data interface 204, ECM data interface 206, and telematics data interface 208 each operably coupled to fuel stop determination logic 202. Optionally in this example, fuel system controller with fuel stop determination logic 110 can also include digital display interface 210.

Fuel stop determination logic 202 can communicate with chassis control module data interface 204 over communication bus 214. In addition, fuel stop determination logic 202 can communicate with ECM data interface 206 over communication bus 216, and can communicate with telematics data interface 208 over communication bus 218. In addition, fuel stop determination logic 202 can optionally communicate with digital display interface 210 over communication bus 220. Chassis control module data interface 204 is operable to provide an interface to a chassis control module, such as chassis control module 106 of FIG. 1. ECM data interface 206 is operable to provide an interface to an ECM, such as ECM 118 of FIG. 1. Telematics data interface 208 is operable to provide an interface to a telematics control module, such as telematics control module 108 of FIG. 1.

Each of chassis control module data interface 204, ECM data interface 206, and telematics data interface 208 can provide for bidirectional data. For example, ECM data interface 206 can receive ECM data, such as fuel burn rate data, from an ECM over communication bus 124 and provide the ECM data to fuel stop determination logic 202 over communication bus 216. Telematics data interface 108 can receive, for example, GPS location data over communication link 122 and provide the GPS location data to fuel stop determination logic 202 over communication bus 218. Telematics data interface 108 can also receive fuel station map data over communication link 122 and provide the fuel station map data to fuel stop determination logic 202 over communication bus 218 as well. In some examples, communication bus 218 can be implemented as separate communication busses such that, for example, one would allow for the transfer of GPS location data to fuel stop determination logic 202 and the other would allow for the transfer of fuel station map data to fuel stop determination logic 202. In some examples, although not shown as such, each of chassis control module data interface 204, ECM data interface 206, and telematics data interface 208 can be accessed by fuel stop determination logic 202 over a common bus. Other configurations as would be recognized by those skilled in the art are contemplated as well.

As noted above, in some examples, some or all of the functions of fuel system controller with fuel stop determination logic 110 may be performed by any suitable processor or processors that may, for example, execute a software driver, firmware, or any other suitable executable code stored in memory. In the example of FIG. 2, fuel system controller 110 includes memory 212, which can store data including executable code that can be accessed by fuel stop determination logic 202 over communication bus 220. In addition, memory 212 can store fuel station map data. For example, fuel stop determination logic 202 can store fuel station map data received from telematics data interface 208 in memory 212.

Figure 3:
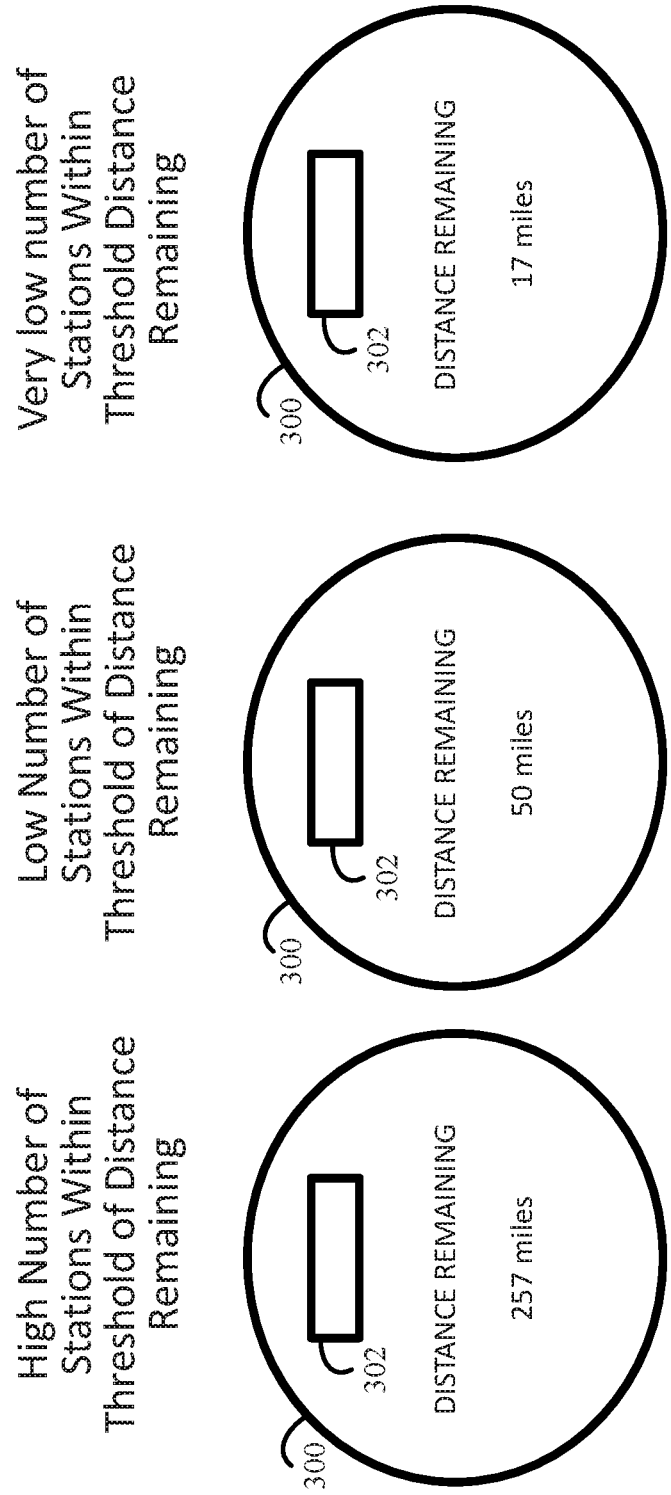
FIGS. 3A-3C illustrate diagrams of a gauge display providing indications to an operator of the vehicle in FIG. 1 in accordance with one example as set forth in this disclosure.

FIGS. 3A-3C illustrate diagrams of a gauge display 300 that can provide warning indications to an operator, such as the operator of vehicle 100 in FIG. 1. For example, gauge display 300 may be implemented as part of the dashboard display 130, or the digital display 112, described above with respect to FIG. 1. As shown, FIG. 3A represents gauge display 300 when a high number of stations are within a threshold of a distance remaining for the vehicle to travel. In this example, warning indication 302 can display a green light indicating to an operator of the vehicle that there is no need to stop at next fueling station. In other examples, warning indication 302 may display no light at all to indicate the same.

FIG. 3B represents gauge display 300 when a low number of stations are within a threshold of a distance remaining for the vehicle to travel. In this example, warning indication 302 can display a yellow light indicating to an operator of the vehicle that the operator should stop the vehicle at an upcoming fueling station to refuel or recharge. FIG. 3C represents gauge display 300 when a very low number of stations (e.g., 1) are within a threshold of a distance remaining for the vehicle to travel. In this example, warning indication 302 can display a red light indicating to an operator of the vehicle that the operator should stop the vehicle at the next fueling station to refuel or recharge. Those of ordinary skill in the art can recognize other ways of displaying the above warning indications, and are contemplated here as well.

Figure 4:
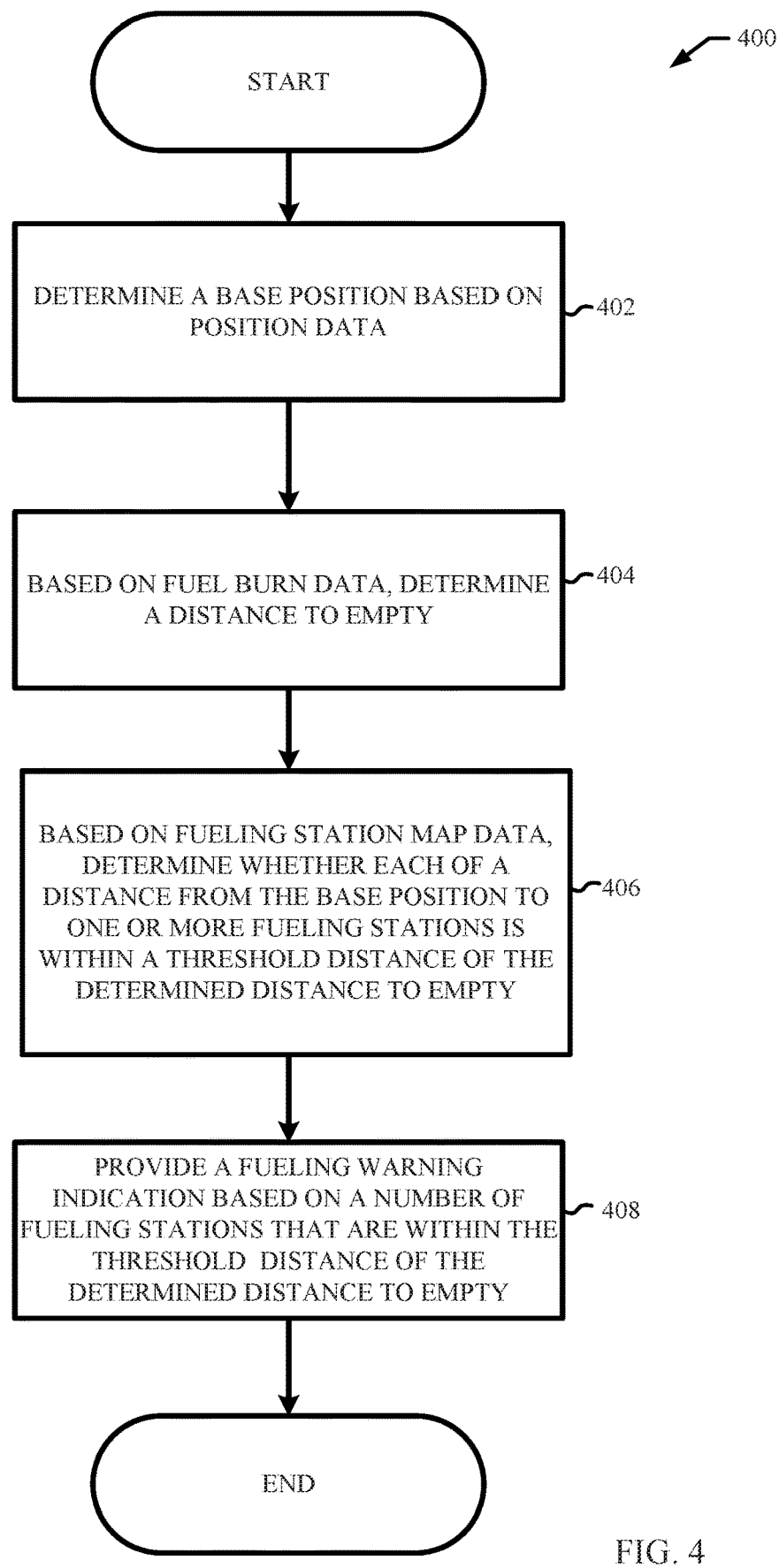
FIG. 4 is a flowchart of a method that may be performed by the fuel system controller with fuel stop determination logic of FIG. 1 in accordance with one example as set forth in this disclosure.

FIG. 4 is a flowchart of an example method providing fuel stop warning indications to an operator of a vehicle such as vehicle 100 of FIG. 1. The method illustrated in FIG. 4, and each of the example methods described herein, may be carried out by the fuel system controller with fuel stop determination logic 110 of FIG. 1. As such, the methods may be carried out by hardware or a combination of hardware and hardware executing software. Suitable hardware may include one or more GPUs, CPUs, ASICs, state machines, FPGAs, digital signal processors (DSPs), or other suitable hardware. Although the methods are described with reference to the illustrated flowcharts, it will be appreciated that many other ways of performing the acts associated with the methods may be used. For example, the order of some operations may be changed, and some of the operations described may be optional. Additionally, while the methods may be described with reference to the example fuel system controller with fuel stop determination logic 110, it will be appreciated that the methods may be implemented by other apparatus as well, and that fuel system controller with fuel stop determination logic 110 may implement other methods.

Referring to FIG. 4, the example flowchart begins at step 402 a base location is determined based on location data. For example, fuel system controller with fuel stop determination logic 110 may receive GPS location data to determine a current location. At step 404, a distance to empty is determined based on fuel burn data. For example, fuel system controller with fuel stop determination logic 110 may receive fuel burn data from ECM 118 to determine how much further the vehicle can travel ("distance to empty") with its current fuel supply level. At step 406, a determination is made as to whether each of a distance from the base location to one or more fueling stations is within a threshold distance of the determined distance to empty using fueling station map data. For example, fuel system controller with fuel stop determination logic 110 may use fueling station map data stored in memory to locate fueling station locations, and then determine whether one or more of those fueling stations are within (e.g., radially within, on the planned route, in the direction of travel, etc.) some threshold distance (e.g., percentage, set distance such as 10 miles, etc.) of the determined distance to empty. At step 408, a fueling warning indication is provided based on the number of fueling stations determined, at step 406, to be within some threshold distance of the determined distance to empty. For example, fuel system controller with fuel stop determination logic 110 may control dashboard display 130 to display an indication to the operator of the vehicle.

Figure 5:
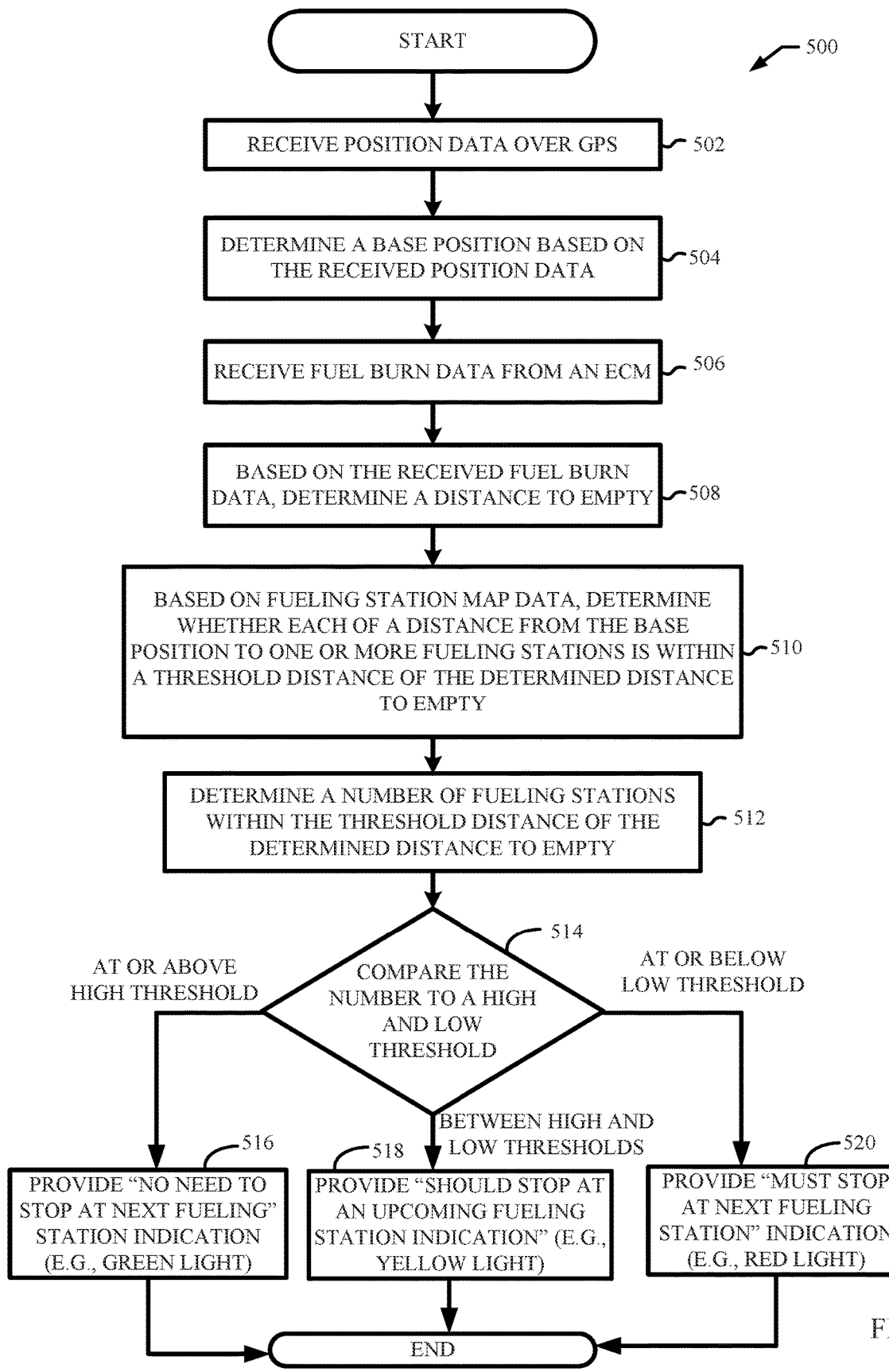
FIG. 5 is another flowchart of a method that may be implemented by the fuel system controller with fuel stop determination logic of FIG. 1 in accordance with one example as set forth in this disclosure.

FIG. 5 is another flowchart of an example method providing fuel stop warning indications to an operator of a vehicle such as vehicle 100 of FIG. 1. At step 502, GPS location data is received. At step 504, a base location is determined based on the GPS location data. At step 506, fuel burn data is received from an ECM. At step 508, a distance to empty is determined based on received fuel burn data. At step 510, a determination is made as to whether each of a distance from the base location to one or more fueling stations is within a threshold distance of the determined distance to empty using fueling station map data. At step 512, a determination is made as to how many fueling stations are within the threshold distance of the determined distance to empty. At step 514, the determined number of fueling stations at step 512 is compared to a high threshold and a low threshold. If the determined number of fueling stations is at or above the high threshold, the method proceeds to step 516 where a "no need to stop at next fueling" station indication is provided, for example, for display. If the determined number of fueling stations is at or below the low threshold, the method proceeds to step 518 where a "should stop at an upcoming fueling station indication" indication is provided, for example, for display. If the determined number of fueling stations is between the low and high thresholds, then the method proceeds to step 520 where a "must stop at next fueling station" indication is provided, for example, for display.

The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. A fuel system controller comprising:
   an engine control module (ECM) interface operable to obtain fuel burn data from an ECM;
   a telematics data interface operable to obtain location data from a telematics control module; and
   fuel stop determination logic operably coupled to the ECM interface and the telematics data interface and configured to:
   determine a base location based on the location data;
   determine a distance to empty based on the fuel burn data;
   based on fueling station map data, determine whether each of a distance from the base location to one or more fueling stations is within a predetermined threshold distance of the determined distance to empty;

provide a fueling warning indication based on a number of fueling stations that are within the predetermined threshold distance of the determined distance to empty; and control a display warning type of the fueling warning indication while the ECM is in an operating state;

wherein the fuel stop determination logic is further operable to provide the fueling warning indication by comparing the number of fueling stations that are within the predetermined threshold distance of the determined distance to empty to a high threshold and a low threshold.

2. The fuel system controller of claim 1, wherein the fuel stop determination logic is operable to display at least one indication on a display device based on a user preference.

3. The fuel system controller of claim 1, wherein when the number of fueling stations is at or above the high threshold, the fuel stop determination logic generates a first indication.

4. The fuel system controller of claim 1, wherein when the number of fueling stations is between the high threshold and the low threshold, the fuel stop determination logic generates a second indication.

5. The fuel system controller of claim 1, wherein when the number of fueling stations is at or below the low threshold, the fuel stop determination logic generates a third indication.

6. The fuel system controller of claim 1, wherein the location data comprises global positioning system (GPS) data.

7. The fuel system controller of claim 6, wherein the fuel stop determination logic is operable to determine the base location based on the GPS data.

8. The fuel system controller of claim 1, wherein the base location includes a current location.

9. The fuel system controller of claim 1, wherein the fuel burn data includes a current fuel burn rate of an engine.

10. A method by a fuel system controller comprising:
obtaining fuel burn data from an ECM;
obtaining location data from a telematics control module;
determining a base location based on the location data;
determining a distance to empty based on the fuel burn data;
based on fueling station map data, determining a number of fueling stations that are within a predetermined threshold distance of the determined distance to empty;
providing a fueling warning indication based on a number of fueling stations that are within the predetermined threshold distance of the determined distance to empty;
controlling a display warning type of the fueling warning indication while the ECM is in an operating state; and
providing the fueling warning indication by comparing the number of fueling stations that are within the predetermined threshold distance of the determined distance to empty to a high threshold and a low threshold.

11. The method of claim 10, further comprising displaying at least one indication on a display device based on a user preference.

12. The method of claim 10, further comprising generating a first indication when the number of fueling stations is at or above the high threshold.

13. The method of claim 10, further comprising generating a second indication when the number of fueling stations is between the high threshold and the low threshold.

14. The method of claim 10, further comprising generating a third indication when the number of fueling stations is at or below the low threshold.

15. The method of claim 10, further comprising including global positioning system (GPS) data in the location data.

16. The method of claim 15, further comprising determining the base location based on the GPS data.

17. The method of claim 10, further comprising including a current location in the base location.

18. The method of claim 10, further comprising including a current fuel burn rate of an engine in the fuel burn data.

* * * * *